(12) United States Patent
Hong et al.

(10) Patent No.: US 8,744,684 B2
(45) Date of Patent: Jun. 3, 2014

(54) PARKING ASSIST SYSTEM AND METHOD FOR VARYING PARKING AREA

(75) Inventors: Wang Gi Hong, Gyeonggi-do (KR); Hong Bum Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 113 days.

(21) Appl. No.: 13/313,788

(22) Filed: Dec. 7, 2011

(65) Prior Publication Data

US 2013/0085640 A1 Apr. 4, 2013

(30) Foreign Application Priority Data

Sep. 30, 2011 (KR) .......................... 10-2011-0100014

(51) Int. Cl.
*B62D 6/00* (2006.01)

(52) U.S. Cl.
USPC .......................................... 701/41; 340/932.2

(58) Field of Classification Search
USPC ................................... 340/932.2; 701/41, 49
See application file for complete search history.

(56) References Cited

U.S. PATENT DOCUMENTS 6,490,515 B1 * 12/2002 Okamura et al. ............... 701/49
2007/0146165 A1 6/2007 Tanaka 2010/0049401 A1 * 2/2010 Watanabe et al. ................ 701/41
2010/0259420 A1 * 10/2010 Von Reyher et al. ........... 701/25
2011/0057813 A1 3/2011 Toledo et al.

FOREIGN PATENT DOCUMENTS

| JP | 2005271866 | 10/2005 |
| JP | 2009161145 | 7/2009 |
| JP | 2009166612 A | 7/2009 |
| JP | 2010208358 A | 9/2010 |
| JP | 2010234937 | 10/2010 |
| KR | 10-2009-0120493 | 11/2009 |
| KR | 1020110068529 A | 6/2011 |

OTHER PUBLICATIONS

Machine Translation: Hideki JP 2009-166612.*
Machine Translation: Hideki JP 2009-166612 (Jul. 30, 2009).*

* cited by examiner

*Primary Examiner* — Thomas Tarcza
*Assistant Examiner* — Kevin Myhre
(74) *Attorney, Agent, or Firm* — Edwards Wildman Palmer LLP; Peter F. Corless

(57) ABSTRACT

Technology for a parking assist system and method for varying a parking area is provided. The parking assist system includes an occupant's build sensing unit configured to sense an occupant's build in a vehicle when parking the vehicle; a control unit configured to set a distance after parking the vehicle between the vehicle and a wall surface of a parking lot according to the occupant's build and to calculate a parking trace; and an automatic steering unit controlled by the control unit and configured to automatically control steering of the vehicle according to the calculated parking trace.

14 Claims, 5 Drawing Sheets

PARKING ASSIST SYSTEM AND METHOD FOR VARYING PARKING AREA

CROSS-REFERENCES TO RELATED APPLICATIONS

The present application claims the priority of Korean patent application No. 10-2011-0100014 filed on Sep. 30, 2011, the disclosure of which is hereby incorporated in its entirety by reference.

BACKGROUND OF THE INVENTION

1. Field of the Invention

The present invention relates to a parking assist system and method for automatically varying a parking area, and more particularly, to technology performing parking assistance by varying a parking area according to an occupant's build.

2. Description of the Related Art

A smart parking assist system searches a parking space using an ultrasonic sensor and a smart wheel sensor, generates a parking path to a parking location, and controls steering. That is, the smart parking assist system allows a driver to automatically park a vehicle just by control of forward and rearward movements and a brake operation without a steering wheel operation.

In other words, the smart parking assist system may scan a zone in which there is a parking space using an ultrasonic wave to search a space and measure a width of the parking space through ultrasonic scanning and a width and length of the parking space through the smart wheel sensor when passing the zone in which there exists the parking space.

The smart parking assist system may check whether or not the searched parking space is available to park the vehicle based on the measured width and length of the parking space, determines an appropriate target parking location when the searched space is an available parking zone as a checking result, generates a parking path from a current location to the target parking location, and controls a steering angle to follow the generated parking path, thereby attempting to park the vehicle to the target parking location.

When performing parking assistance, when an occupant's own vehicle to be parked protrudes from surrounding vehicles, a parking appearance is spoiled and parking hazards during parking are increased. Accordingly, it is required that the vehicle be parked closer to a curb or a wall surface.

Thus, the conventional smart parking assist system calculates a parking area to maintain the fixed distance to a curb or a wall surface in the parking zone, regardless of the occupant and the occupant's build.

However, when parking the vehicle with maintaining the fixed distance to the curb or wall surface, the occupant of a bigger build feels inconvenience due to a narrow space at the time the occupant gets into and out of the vehicle, and since the distance to the curb or wall surface is fixedly maintained even when the occupant is not in the vehicle, there is also a problem of creating a waste of the parking space

SUMMARY OF THE INVENTION

Various aspects of the present invention have been made in view of the above problems, and provide a parking assist system and a method for varying a parking area which automatically vary a distance between a vehicle and a parking wall surface by detecting the occupant's build when parking the vehicle.

According to an aspect of the present invention, a parking assist system for varying a parking area is provided. The parking assist system may include: an occupant's build sensing unit configured to sense an occupant's build when parking a vehicle; a control unit configured to set a distance after parking the vehicle between the vehicle and a wall surface of a parking lot according to the occupant's build and calculate a parking trace; and an automatic steering unit controlled by the control unit and configured to automatically control steering of the vehicle according to the calculated parking trace.

According to another aspect of the present invention, a parking assist system for varying a parking area is provided. The parking assist system may include: an occupant's build sensing unit configured to sense an occupant's weight in a vehicle when parking the vehicle; a control unit configured to set a distance after parking the vehicle between the vehicle and a wall surface of a parking lot according to the occupant's weight and calculate a parking trace; and an automatic steering unit controlled by the control unit and configured to automatically control steering of the vehicle according to the calculated parking trace.

According to still another aspect of the present invention, a parking assist method of varying a parking area is provided. The method may include: sensing an occupant's build in a vehicle; setting a distance after parking the vehicle between the vehicle and a wall surface of a parking lot according to the occupant's build; calculating a parking trace according to the set distance after parking the vehicle; and performing parking assist according to the calculated parking trace.

According to still another aspect of the present invention, a parking assist method of varying a parking area is provided. The method may include: sensing a weight of an occupant in a vehicle; setting up a distance after parking between the vehicle and a wall surface of a parking lot according to the weight of the occupant in the vehicle; calculating a parking trace according to the set distance after parking the vehicle; and performing parking assistance according to the calculated parking trace.

As described above, the parking assist system and method for varying a parking area according to exemplary embodiments of the present invention has an effect of increasing occupant's parking convenience by varying the parking area according to an occupant's build.

The systems and methods of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Figure 1:
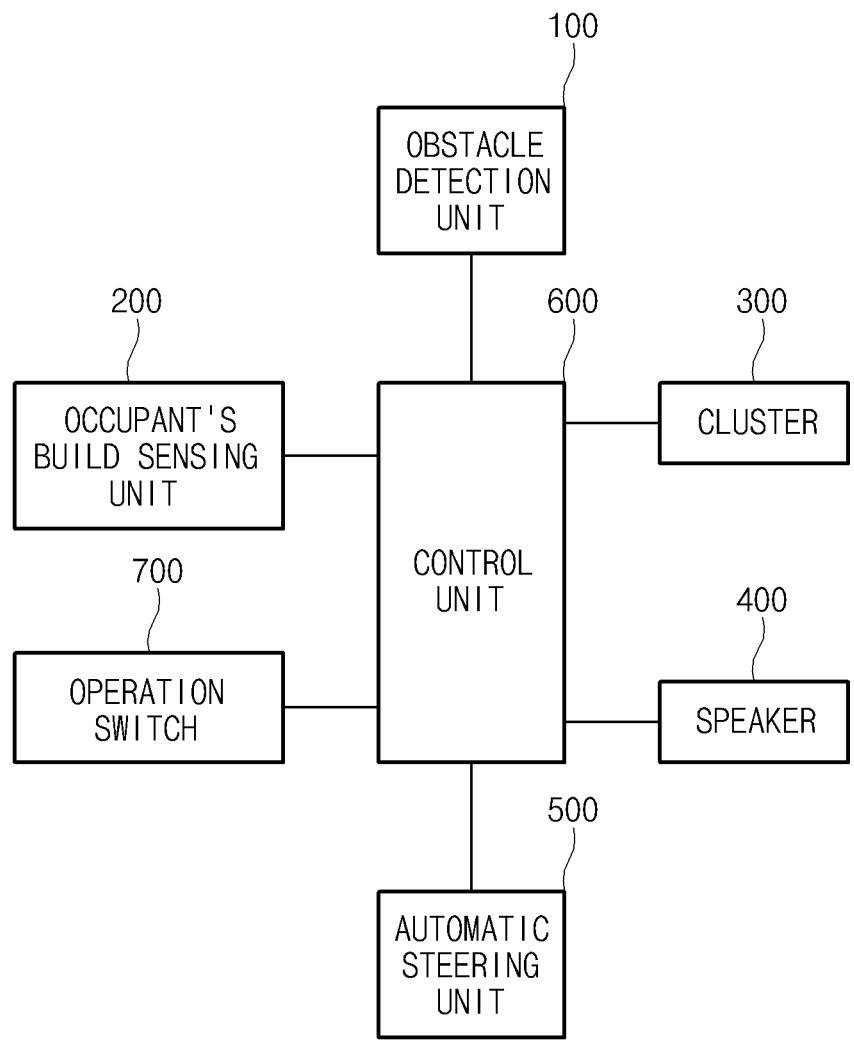
FIG. 1 is a block diagram showing a configuration of a parking assist system for varying a parking area according to an exemplary embodiment of the present invention.

Reference will now be made in detail to various embodiments of the present invention(s), examples of which are illustrated in the accompanying drawings and described below. Like reference numerals in the drawings denote like elements. When it is determined that detailed description of a configuration or a function in the related disclosure interrupts understandings of embodiments in description of the embodiments of the invention, the detailed description will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

FIG. 1 is a block diagram illustrating a configuration of a parking assist system for varying a parking area according to an exemplary embodiment of the present invention.

The parking assist system for varying a parking area according to an exemplary embodiment of the present invention includes an obstacle detection unit 100, an occupant's build sensing unit 200, a cluster 300, a speaker 400, an automatic steering unit 500, a control unit 600, and an operation switch 700.

The obstacle detection unit 100 detects a distance from a vehicle to a wall surface within a parking zone. The obstacle detection unit 100 is implemented with an ultrasonic sensor, and the like. The obstacle detection unit 100 is provided at front, lateral or rear side of the vehicle.

Figure 2:
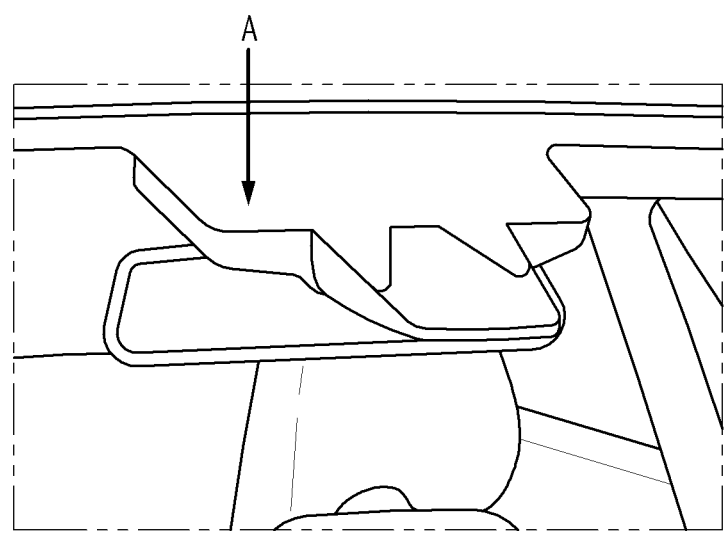
FIG. 2 is an illustrative view showing an installation location of an occupant's build sensing unit (camera or ultrasonic sensor) of FIG. 1.
Figure 3:
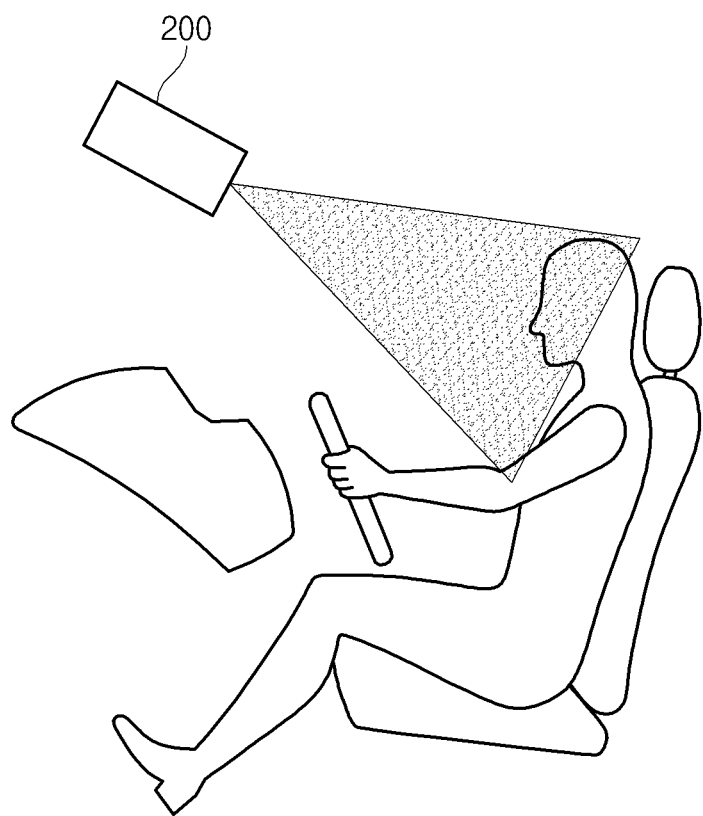
FIG. 3 is a view showing an occupant imaging area or sensing area by the occupant's build sensing unit (camera or ultrasonic sensor) of FIG. 2.

The occupant's build sensing unit 200 senses the occupant's build in the vehicle and transmits a sensing result to the control unit 600. The occupant's build sensing unit 200 is implemented with a camera, an ultrasonic sensor, an occupant detection system (ODS), or the like. When the occupant's build sensing unit 200 is a camera or an ultrasonic sensor, as shown in FIG. 2, the occupant's build sensing unit 200 is installed around an interior room lamp indicated as "A", thereby imaging or sensing an occupant of a driver seat or a passenger seat as shown in FIG. 3. The cluster 300 displays a screen for a parking space, a screen of searching completion for a parking space, a screen for a parking situation, and the like.

The speaker 400 outputs an effect sound at the time of entering into a parking mode or ending detection of a parking space and outputs an alarm sound in danger such as collision.

The automatic steering unit 500 is controlled by the control unit 600 to perform automatic steering of the vehicle. At this time, the automatic steering unit 500 includes a motor driven power steering (MDPS).

The control unit 600 automatically sets a distance between the vehicle and a parking wall surface according to a occupant's build mode sensed by the occupant's build sensing unit 200, calculates a parking trace, and then computes a steering angle.

Figure 4:
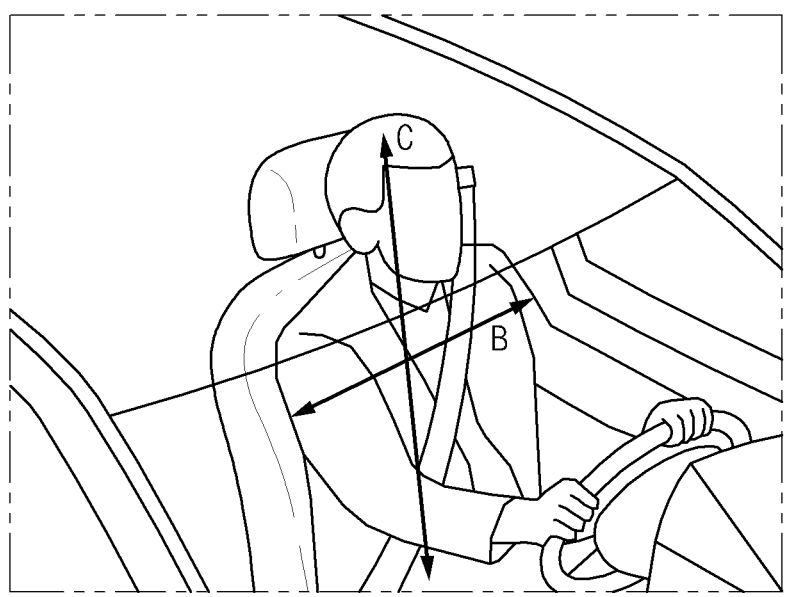
FIG. 4 is a view explaining a method of measuring an occupant's build through a imaging result or a sensing result by the occupant's build sensing unit (camera or ultrasonic sensor) of FIG. 1.

When the occupant's build sensing unit 200 is a camera or an ultrasonic sensor, as shown in FIG. 4, the control unit 600 may analyze at least one of a chest width (B) and a sitting height (C) of the occupant seated on a driver seat or passenger seat, through the imaged or sensed result data and calculates the occupant's build mode. At this time, the occupant's build mode is divided into an occupant absence mode, a normal build mode, a large build mode, and a very large build mode. In the occupant absence mode, the distance between the vehicle and the parking wall surface may be set to 200 mm. In the normal build mode, the distance between the vehicle and the parking wall surface may be set to 400 mm. In the large build mode, the distance between the vehicle and the parking wall surface may be set to 600 mm. In the very large build mode, the distance between the vehicle and the parking wall surface may be set to 800 mm. Those skilled in the art will understand that the values shown for distances herein are merely examples, and are not meant to limit the scope of the invention.

Alternatively, when the occupant's build sensing unit 200 is an ODS, the occupant's build mode is divided according to a weight of the occupant and the distance between the vehicle and the parking wall surface according to the occupant's build mode may be set according to the example table 1 below.

TABLE 1

| Occupant weight (kg) | Occupant's build mode | Distance to vehicle after parking surface (mm) |
| --- | --- | --- |
| 0~10 | Occupant absence mode | 200 |
| 11~70 | Normal build mode | 400 |
| 71~90 | Large build mode | 600 |
| 91 or more | Very large build mode | 800 |

In the exemplary embodiment of the present invention, an example in which when the occupant's weight is 0 to 10 Kg, the occupant's build mode is determined as "occupant absence mode" is taken. However, the weight of the occupant may be further subdivided. For example, when the occupant's weight is 3 to 10 Kg, the occupant is determined as a pet dog, an infant or a toddler. In this case, it may be implemented to enter "the very large build mode" so as to consider a case in which the occupant gets out of the vehicle with the pet dog, the infant or the toddler settled in the occupant's arms.

In addition, when the occupant's build sensing unit 200 is a camera or an ultrasonic sensor, as shown in FIG. 4, the control unit 600 analyzes information for a chest width and a sitting height and determines the occupant's build mode based on an analyzed result regardless of the occupant's weight.

The operation switch 700 is an on/off switch for operation of the parking steering assist system.

Hereinafter, a parking assist method of varying a parking area according to an exemplary embodiment of the present invention will be described with reference to FIG. 5.

First, the control unit 600 determines whether or not a parking mode is selected according to an on/off operation of the operation switch 700 (S101).

When the parking mode is selected as a determined result in the step S101, the control unit 600 determines whether the vehicle is parked in a driver seat direction mode or in a passenger seat direction mode (S 102).

When parking the vehicle in the passenger seat direction mode, the occupant's build sensing unit 200 senses an occupant's build of the passenger seat and the control unit 600 determines an occupant's build mode (S103). Alternatively, when parking the vehicle in the driver seat direction mode, the occupant's build sensing unit 200 senses an occupant's build of the driver seat and the control unit 600 determines an occupant's build mode (S104).

At this time, the occupant's build sensing unit 200 performs imaging or ultrasonic sensing of an occupant and the control unit 600 analyzes a chest width and a sitting height of the occupant from imaging result data or ultrasonic sensing result data and determines the occupant's build mode. Meanwhile, when the occupant's build sensing unit 200 is an ODS, the occupant's build sensing unit 200 senses a weight of the occupant and then transmits a sensing result to the control unit 600. The control unit 600 determines the occupant's build mode according to the weight.

As a determination result, when the occupant's build mode is the occupant absence mode (S105), the control unit 600 sets the distance after parking the vehicle, between the vehicle and the parking wall surface, e.g., to 200 mm (S106).

When the occupant's build mode is the normal build mode (S107), the control unit 600 sets the distance after parking the vehicle, between the vehicle and the parking wall surface, e.g., to 400 mm (S108).

When the occupant's build mode is the large build mode (S109), the control unit 600 sets the distance after parking the vehicle, between the vehicle and the parking wall surface, e.g., to 600 mm (S110).

When the occupant's build mode is not large build mode, the control unit 600 determines the occupant's build mode as the very large build mode and sets the distance after parking the vehicle, between the vehicle and the parking wall surface, e.g., to 800 mm (S111).

After that, the control unit 600 searches a parking space and calculates a parking trace using the set distance information between the vehicle and the parking wall surface (S112).

The cluster 300 displays a screen of detection completion of the parking space (S113). The control unit 600 controls the automatic steering unit 500 to automatically control steering, thereby performing parking assistance (S114).

Figure 5:
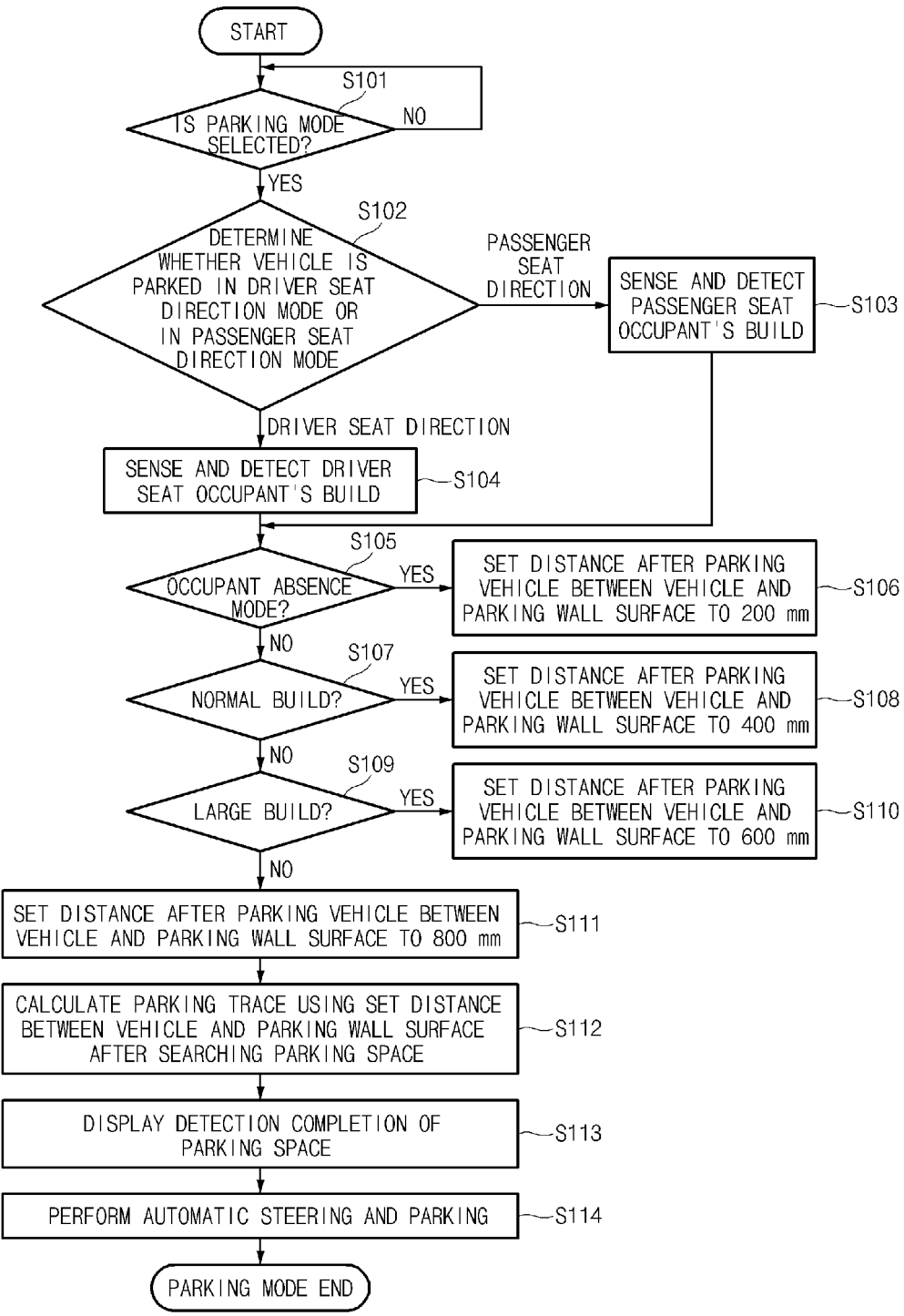
FIG. 5 is a flow chart illustrating a parking assist method of automatically varying a parking area according to an exemplary embodiment of the present invention.

Although the FIG. 5 has illustrated the parking assist method of varying a parking area depending upon the weight of the occupant seated on the driver seat or passenger seat, the exemplary embodiment of the invention may be applied to the occupant seated on the right side or the left side of the rear seat.

In addition, FIG. 5 has illustrated an example in which the distance after parking the vehicle, between the vehicle and the parking wall surface is set by determining the occupant's build mode. However, it is possible to set the distance after parking the vehicle, between the vehicle and the parking wall surface according to the occupant's weight without determining the occupant's build mode. For example, when the weight of the occupant is 10 Kg or less, the distance after parking the vehicle, between the vehicle and the parking wall surface may be set to 200 mm; when the weight of the occupant is between 11 kg and 70 Kg, the distance after parking the vehicle, between the vehicle and the parking wall surface may be set to 400 mm; when the weight of the occupant is between 71 kg and 90 Kg, the distance after parking the vehicle between the vehicle and the parking wall surface may be set to 600 mm; and when the weight of the occupant is 91 kg or more, the distance after parking the vehicle between the vehicle and the parking wall surface may be set to 800 mm.

Thus, according to exemplary embodiment of the present invention, when the occupant gets into or out of the vehicle after parking, it is possible to obtain sufficient space from the parking wall surface by automatically varying the parking area when parking the vehicle according to the occupant's build or weight, thereby increasing occupant's parking convenience.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A parking assist system for varying a parking area, the system comprising:
    an occupant's build sensing unit configured to sense an occupant's build in a vehicle when parking the vehicle;
    a control unit configured to set a distance after parking the vehicle between the vehicle and a wall surface of a parking lot based on a mode that corresponds to the occupant's build and to calculate a parking trace based on the distance after parking the vehicle; and
    an automatic steering unit controlled by the control unit and configured to automatically control steering of the vehicle according to the calculated parking trace,
    wherein the control unit divides the occupant's build into an occupant absence mode, a normal build mode, a large build mode, and a very large build mode and sets the distance after parking the vehicle between the vehicle and the wall surface of the parking lot based on the occupant's build,
    wherein the occupant absence mode is further subdivided as the smallest range for determining builds, and
    wherein when the occupant's build is included in the smallest range for determining build, the control unit is configured to enter the very large build mode.

2. The system according to claim 1, wherein the occupant's build sensing unit is one of either a camera or an ultrasonic sensor.

3. The system according to claim 1, wherein the control unit determines an occupant's build using at least one of chest width information and sitting height information of the occupant from sensed result data of the occupant's build sensing unit.

4. The system according to claim 3, wherein the control unit sets the distance after parking the vehicle between the vehicle and the wall surface of the parking lot to be larger as the build of the occupant is bigger.

5. A parking assist system for varying a parking area, the system comprising:
    an occupant's build sensing unit configured to sense an occupant's weight in a vehicle when parking the vehicle;
    a control unit configured to set a distance after parking the vehicle between the vehicle and a wall surface of a parking lot based on a mode that corresponds to the occupant's weight and calculate a parking trace based on the distance after parking the vehicle; and
    an automatic steering unit controlled by the control unit and configured to automatically control steering of the vehicle according to the calculated parking trace,
    wherein the control unit divides the occupant's build into an occupant absence mode, a normal build mode, a large build mode, and a very large build mode and sets the distance after parking the vehicle between the vehicle and the wall surface of the parking lot based on the occupant's build, wherein the occupant absence mode is further subdivided as the smallest range for determining builds, and wherein when the occupant's weight is included in the smallest range for determining weights, the control unit is configured to enter the very large build mode.

6. The system according to claim 5, wherein the occupant's build sensing unit is an occupant detection system (ODS) configured to detect the weight of the occupant.

7. The system according to claim 5, wherein the control unit sets the distance after parking the vehicle between the vehicle and the wall surface of the parking lot to be larger as the occupant is heavier.

8. The system according to claim 5, further comprising:
an obstacle detection unit configured to detect forward, lateral, and rearward obstacles of the vehicle; and
a cluster configured to display the parking trace on a screen.

9. A parking assist method of varying a parking area, the method comprising:
sensing an occupant's build in a vehicle;
setting a distance after parking the vehicle between the vehicle and a wall surface of a parking lot based on a mode that corresponds to the occupant's build;
calculating a parking trace according to the set distance after parking the vehicle; and
performing parking assistance according to the calculated parking trace,
wherein the control unit divides the occupant's build into an occupant absence mode, a normal build mode, a large build mode, and a very large build mode and sets the distance after parking the vehicle between the vehicle and the wall surface of the parking lot based on the occupant's build,
wherein the occupant absence mode is further subdivided as the smallest range for determining builds, and
wherein setting a distance after parking the vehicle includes, when the occupant's build is included in the smallest range for determining build, entering the very large build mode.

10. The method according to claim 9, wherein the sensing the occupant's build in the vehicle includes:
one of either imaging or ultrasonic sensing an occupant in the vehicle; and
determining the occupant's build according to a corresponding imaging result or an ultrasonic sensing result.

11. The method according to claim 10, further comprising:
determining the occupant's build using at least one of sitting height information and chest width information from the imaging result or the ultrasonic sensing result.

12. The method according to claim 9, further comprising:
determining whether the vehicle is parked in a driver seat direction mode or a passenger seat direction mode; and
sensing an occupant's build of the driver seat direction when parking the vehicle in the driver seat direction mode, and sensing an occupant's build of the passenger seat direction when parking the vehicle in the passenger seat direction mode.

13. A parking assist method of varying a parking area, the method comprising:
sensing a weight of an occupant in a vehicle;
setting a distance after parking the vehicle between the vehicle and a wall surface of a parking lot based on a mode that corresponds to the weight of the occupant in the vehicle;
calculating a parking trace according to the set distance after parking the vehicle; and
performing parking assistance according to the calculated parking trace,
wherein the control unit divides the occupant's build into an occupant absence mode, a normal build mode, a large build mode, and a very large build mode and sets the distance after parking the vehicle between the vehicle and the wall surface of the parking lot based on the occupant's build,
wherein the occupant absence mode is further subdivided as the smallest range for determining builds, and
wherein setting a distance after parking the vehicle includes, when the occupant's weight is included in the smallest range for determining weights, entering the very large build mode.

14. The method according to claim 13, wherein the setting a distance after parking the vehicle includes setting the distance after parking between the vehicle and the wall surface of the parking lot to be larger as the occupant is heavier.

* * * * *